(12) United States Patent
Furusho et al.

(10) Patent No.: US 9,476,499 B2
(45) Date of Patent: Oct. 25, 2016

(54) SHOVEL

(71) Applicant: Sumitomo Heavy Industries, Ltd., Tokyo (JP)

(72) Inventors: Kentaro Furusho, Kanagawa (JP); Kazunori Hiranuma, Kanagawa (JP); Takeshi Okada, Kanagawa (JP); Yoshitaka Shizu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 33 days.

(21) Appl. No.: 14/664,185

(22) Filed: Mar. 20, 2015

(65) Prior Publication Data

US 2015/0276044 A1  Oct. 1, 2015

(30) Foreign Application Priority Data

Mar. 26, 2014  (JP) ................................. 2014-064651

(51) Int. Cl.
*F16H 57/08* (2006.01)
*F16H 1/46* (2006.01)
*E02F 9/12* (2006.01)
*E02F 9/20* (2006.01)

(52) U.S. Cl.
CPC .............. *F16H 57/08* (2013.01); *E02F 9/123* (2013.01); *E02F 9/128* (2013.01); *E02F 9/2095* (2013.01); *F16H 1/46* (2013.01); *F16H 2057/085* (2013.01)

(58) Field of Classification Search
CPC ............. F16H 1/46; F16H 2001/2881; F16H 2057/02034; F16H 2057/02069; F16H 2057/02073; F16H 57/08; F16H 57/21; E02F 9/123; E02F 9/128; E02F 9/2095
See application file for complete search history.

(56) References Cited

U.S. PATENT DOCUMENTS

| 1,707,877 A | * | 4/1929 | Roberts | F16H 1/46 475/331 |
| 2014/0296017 A1 | * | 10/2014 | Okada | E02F 9/123 475/159 |
| 2015/0233091 A1 | * | 8/2015 | Furusho | E02F 9/126 475/159 |

FOREIGN PATENT DOCUMENTS

JP      2013-227798 A   11/2013

* cited by examiner

*Primary Examiner* — Jacob S Scott
(74) *Attorney, Agent, or Firm* — Fenwick & West LLP (57) ABSTRACT

A shovel includes: a speed reducer configured by stacking a plurality of gear speed reducers each having a sun gear, a planetary gear, an internal gear, and a carrier member supporting the planetary gear provided in a case, in a direction of an axis of rotation of an upper turning body; and a movement restriction section which is provided between the sun gear of one gear speed reducer among the gear speed reducers stacked in a plurality and another gear speed reducer stacked so as to face the sun gear and restricts movement of the sun gear of the one gear speed reducer toward the other gear speed reducer, wherein the movement restriction section is provided at the case.

4 Claims, 6 Drawing Sheets

SHOVEL

RELATED APPLICATIONS

Priority is claimed to Japanese Patent Application No. 2014-064651, filed Mar. 26, 2014, the entire content of which is incorporated herein by reference.

BACKGROUND

1. Technical Field

A certain embodiment of the invention relates to a shovel having a turning speed reducer.

2. Description of Related Art

A shovel is provided with a turning drive device which drives an upper turning body so as to turn it. The turning drive device often reduces the power from a power source (a hydraulic motor, an electric motor, or the like) in a turning speed reducer (hereinafter referred to simply as a speed reducer) and turns the upper turning body by increased output torque.

As the speed reducer, in terms of being compact, in terms of a change in reduction ratio being easy, or the like, a planetary gear speed reducer in which a sun gear is used as an input element and a planetary carrier of a planetary gear is used as an output element is frequently used. Further, in order to obtain a predetermined reduction ratio, a multistage speed reducer in which a plurality of planetary gear speed reducers are stacked is also frequently used (refer to the related art).

SUMMARY

According to an aspect of the present invention, there is provided a shovel including: a speed reducer configured by stacking a plurality of gear speed reducers each having a sun gear, a planetary gear, an internal gear, and a carrier member supporting the planetary gear provided in a case, in a direction of an axis of rotation of an upper turning body; and a movement restriction section which is provided between the sun gear of one gear speed reducer among the gear speed reducers stacked in a plurality and another gear speed reducer stacked so as to face the sun gear and restricts movement of the sun gear of the one gear speed reducer toward the other gear speed reducer, wherein the movement restriction section is provided at the case.

DETAILED DESCRIPTION

A planetary carrier is supported on a case by a bearing member (a bearing or the like), whereby the movement of the planetary carrier in a thrust direction (an axial direction) is restricted. However, a shovel is used in a harsh environment, and thus there is a concern that a great external force may be applied to a lower traveling body and an upper turning body during work.

In a case where the external force is applied, a low-speed side sun gear provided in a low-speed planetary gear speed reducer disposed on the lower side is sometimes biased so as to move toward a high-speed planetary gear speed reducer disposed at an upper portion. The movement and biasing force is applied to the bearing member through a high-speed side planetary carrier. Accordingly, there is a problem in that there is a concern that the bearing member may be damaged due to the movement and biasing force.

It is desirable to provide a shovel in which a bearing member supporting a carrier member is prevented from being damaged.

According to a certain aspect of the present invention, the movement of a carrier member in a thrust direction is restricted, and thus a bearing member can be prevented from being damaged.

Next, a non-limiting exemplary embodiment of the present invention will be described with reference to the accompanying drawings.

In addition, in the description in all the accompanying drawings, the same or corresponding members or components are denoted by the same or corresponding reference numerals and overlapping description is omitted. Further, the drawings are not intended to show the relative ratio between members or components unless otherwise specified. Therefore, specific dimensions can be determined by those skilled in the art in the light of the following non-limiting embodiment.

Further, an embodiment described below is not intended to limit the invention and is illustrative, and all the features which are described in the embodiment or the combinations thereof are not necessarily essential for the invention.

Figure 1:
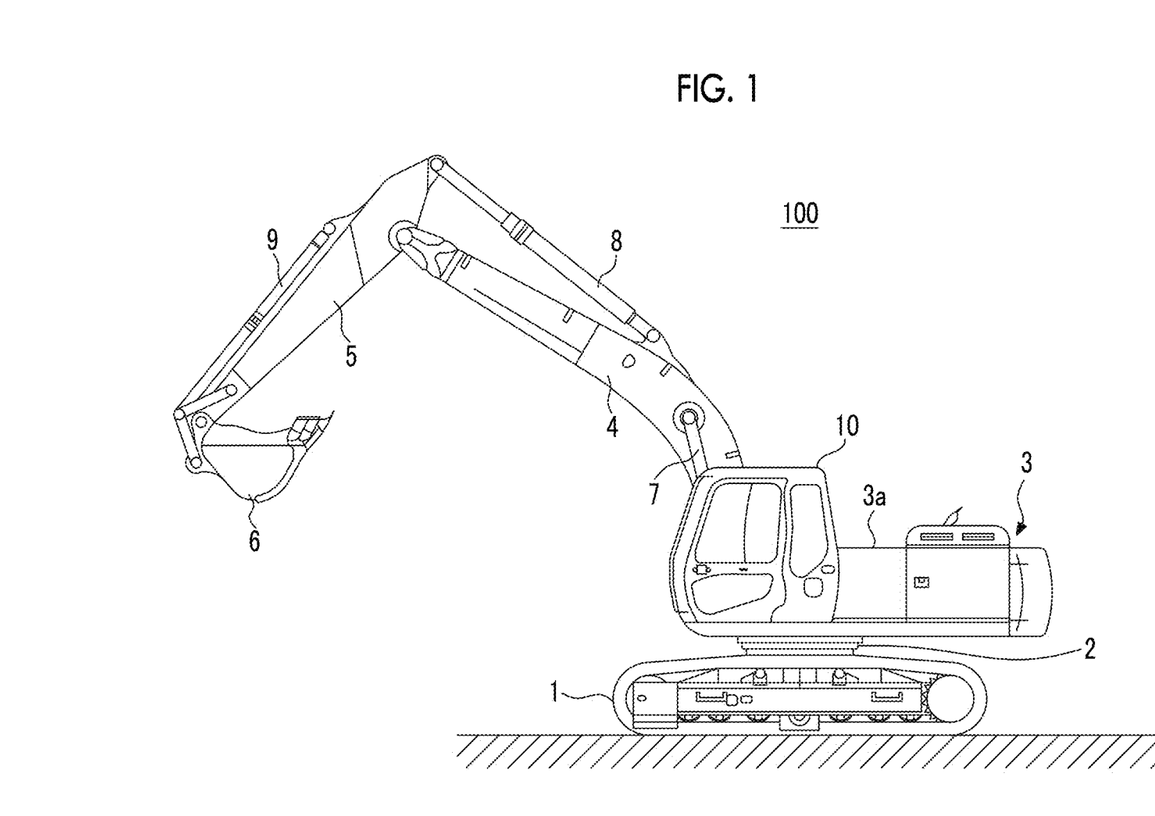
FIG. 1 is a side view of a shovel according to an embodiment of the present invention.

FIG. 1 shows a shovel 100 according to an embodiment of the present invention.

In the shovel 100, an upper turning body 3 is mounted on an upper portion of a lower traveling body 1 through a rotation mechanism 2. The upper turning body 3 is provided with an engine compartment 3a, a boom 4, an arm 5, a bucket 6, and a cabin 10, and the like.

The arm 5 is attached to the tip of the boom 4, and the bucket 6 is attached to the tip of the arm 5. The boom 4, the arm 5, and the bucket 6 are respectively hydraulically driven by a boom cylinder 7, an arm cylinder 8, and a bucket cylinder 9.

In the cabin 10, an operating device 26 (refer to FIG. 2) which is operated by a driver, and the like are disposed. Further, in the engine compartment 3a, a power source such as an engine is mounted.

In addition, as the shovel according to this embodiment, a so-called hybrid shovel having a power storage device which stores electric power which is supplied to a turning drive device is given as an example. However, the present invention can also be applied to, for example, an electrically-driven shovel to which charging power is supplied from an external power supply, and a hydraulic shovel in which the rotation mechanism 2 is driven by a hydraulic motor, as long as they are shovels adopting a mechanical brake (described later).

Figure 2:
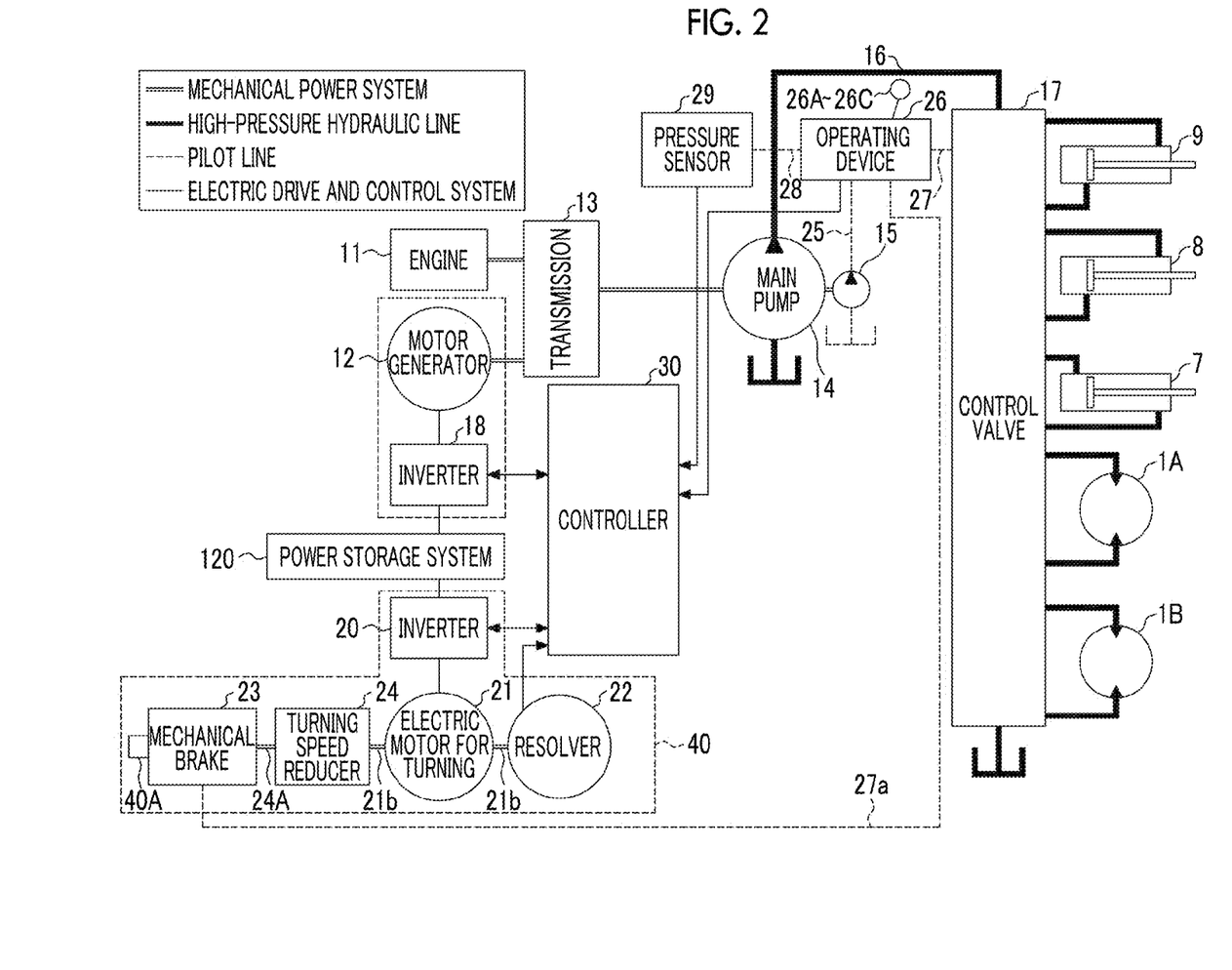
FIG. 2 is a block diagram showing the configuration of a drive system in an embodiment of the present invention.

FIG. 2 is a block diagram showing the configuration of a drive system of the shovel. In addition, in FIG. 2, a mechanical power system is shown by a double line, a high-pressure hydraulic line is shown by a thick solid line, a pilot line is shown by a dashed line, and an electric drive and control system is shown by a thin solid line.

The drive system of the shovel has an engine 11, a motor generator 12, a main pump 14, a pilot pump 15, a control valve 17, the operating device 26, a controller 30, a turning drive device 40, a power storage system, and the like.

The engine 11 and the motor generator 12 are respectively connected to two input shafts of a transmission 13. The main pump 14 and the pilot pump 15 are connected to an output shaft of the transmission 13. Both the main pump 14 and the pilot pump 15 are hydraulic pumps.

The control valve 17 is connected to the main pump 14 through a high-pressure hydraulic line 16. Further, the operating device 26 is connected to the pilot pump 15 through a pilot line 25.

The control valve 17 performs the control of a hydraulic system in the hybrid shovel. Accordingly, hydraulic motors 1A and 1B for the lower traveling body, the boom cylinder 7, the arm cylinder 8, the bucket cylinder 9, and the like are connected to the control valve 17 through the high-pressure hydraulic lines.

The motor generator 12 is connected to a power storage system 120 through an inverter 18. The power storage system 120 has a capacitor (a power storage device) as an electric condenser. Further, the power storage system 120 is connected to the turning drive device 40.

The turning drive device 40 has an electric motor for turning 21, a resolver 22, a mechanical brake 23, a turning speed reducer 24, and the like. The power storage system 120 is connected to the electric motor for turning 21 through an inverter 20. Further, an output shaft 21b of the electric motor for turning 21 is connected to the resolver 22 and the turning speed reducer 24.

The electric motor for turning 21 functions as an electric motor for turning which drives the upper turning body 3 so as to turn it. Further, the mechanical brake 23 functions as a brake device which mechanically applies braking to the upper turning body 3.

The operating device 26 has a lever 26A, a lever 26B, and a pedal 26C. The lever 26A, the lever 26B, and the pedal 26C are respectively connected to the control valve 17 and a pressure sensor 29 through hydraulic lines 27 and 28. Further, the pressure sensor 29 is connected to the controller 30 which performs the drive control of an electric system.

The controller 30 is a control device as a main control unit which performs the drive control of the hybrid shovel. The controller 30 is configured with an arithmetic processing unit which includes a central processing unit (CPU) and an internal memory. The controller 30 executes predetermined drive control by executing a program for drive control stored in the internal memory by the CPU.

Specifically, the controller 30 converts a signal which is supplied from the pressure sensor 29 into a speed command and performs the drive control of the electric motor for turning 21 based on the signal. At this time, the signal which is supplied from the pressure sensor 29 is a signal indicating an operation amount by which a driver operates the operating device 26 in order to turn the rotation mechanism 2.

Further, the controller 30 performs the operation control of the motor generator 12. Here, the operation control of the motor generator 12 refers to control performing switching between an electric (assist) operation and a power-generating operation.

In addition, the controller 30 performs the charge and discharge control of a capacitor provided in the power storage system 120. Specifically, the controller 30 performs the switching control between a step-up operation and a step-down operation of a step-up/down converter of the power storage system 120 based on a charge state of the capacitor, an operating state of the motor generator 12, and an operating state of the electric motor for turning 21.

In this embodiment, the operating state of the motor generator 12 includes two operating states, an electric (assist) operation state and a power-generating operation state. Further, the operation state of the electric motor for turning 21 includes two operating states, a power running operation and a regenerative operation. In addition, the controller 30 also performs the control of an amount (a charging current or charging power) which is charged to the capacitor, as will be described later.

The shovel having the above-described drive system drives the electric motor for turning 21 by electric power which is supplied through the inverter 20, when driving the upper turning body 3 so as to turn it. The rotary force of the output shaft 21b of the electric motor for turning 21 is transmitted to an output shaft 40A of the turning drive device 40 through the turning speed reducer 24.

Figure 3:
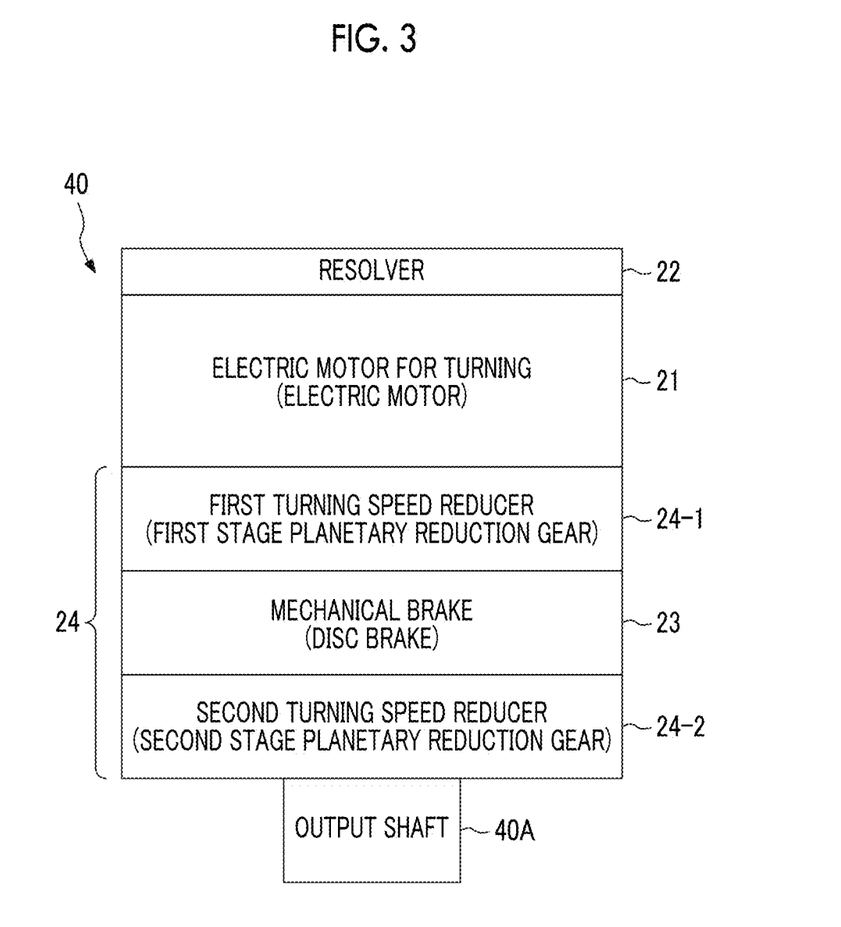
FIG. 3 is a block diagram showing the configuration of a turning drive device in an embodiment of the present invention.

FIG. 3 is a block diagram of the turning drive device 40 which is mounted on the shovel according to an embodiment of the present invention. The turning drive device 40 has the electric motor for turning 21, the resolver 22, the mechanical brake 23, the turning speed reducer 24, the output shaft 40A, and the like.

The electric motor for turning 21 is an electric motor. The turning speed reducer 24 is connected to the output shaft side of the electric motor for turning 21. The turning speed reducer 24 has a first turning speed reducer 24-1 and a second turning speed reducer 24-2. Each of the first turning speed reducer 24-1 and the second turning speed reducer 24-2 is configured with a planetary gear speed reducer.

The first turning speed reducer 24-1 of a first stage is assembled to the electric motor for turning 21. Further, the mechanical brake 23 is provided at a planetary carrier 46 serving as an output shaft of the first turning speed reducer 24-1. Further, the second turning speed reducer 24-2 of a second stage is assembled to the first turning speed reducer 24-1 with the mechanical brake 23 interposed therebetween. Then, an output shaft of the second turning speed reducer 24-2 of the second stage serves as the output shaft 40A of the turning drive device 40.

In addition, although not shown in the drawings, the output shaft 40A of the turning drive device 40 is connected to the rotation mechanism 2, and the rotation mechanism 2 is driven by the rotary force of the output shaft 40A.

Next, a specific configuration of the turning drive device 40 will be described with reference to FIGS. 5 and 6.

Figure 5:
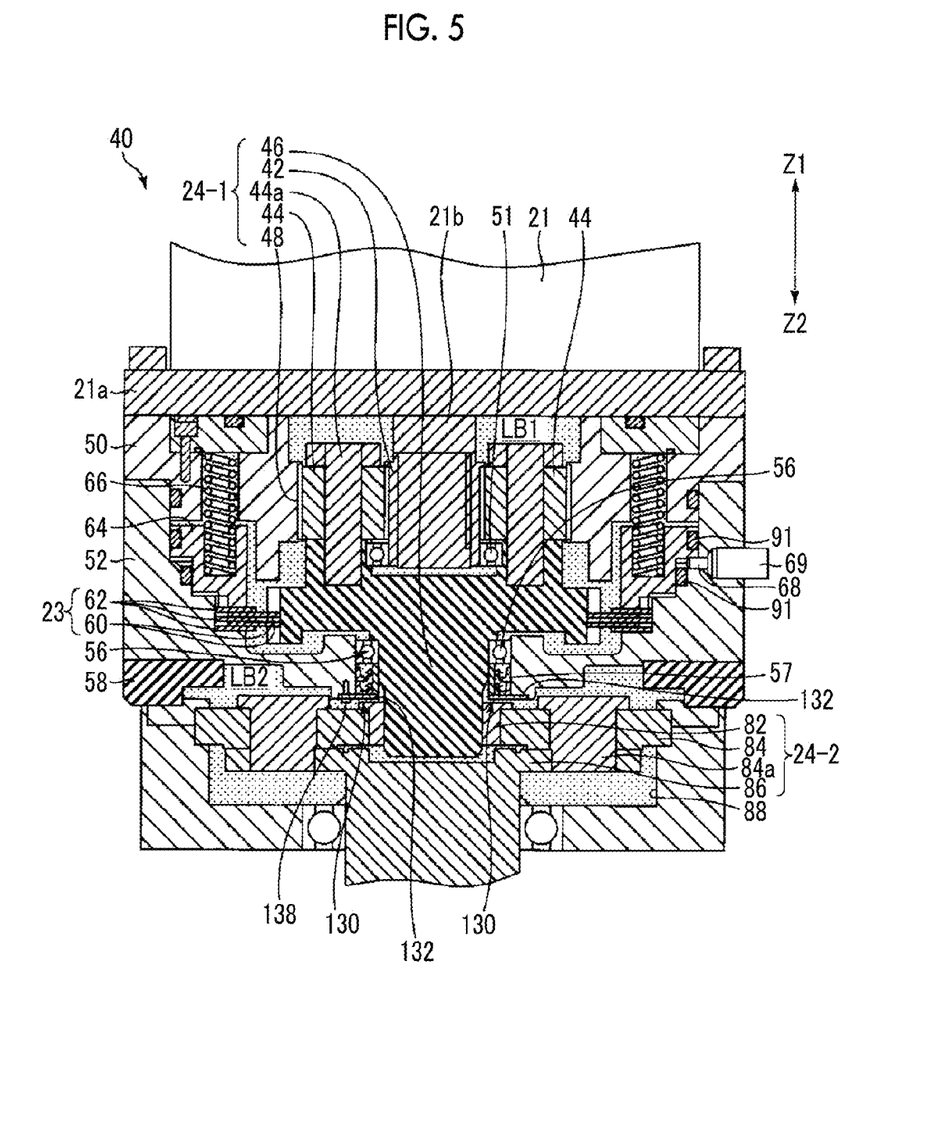
FIG. 5 is a cross-sectional view along a line V-V in FIG. 4.
Figure 6:
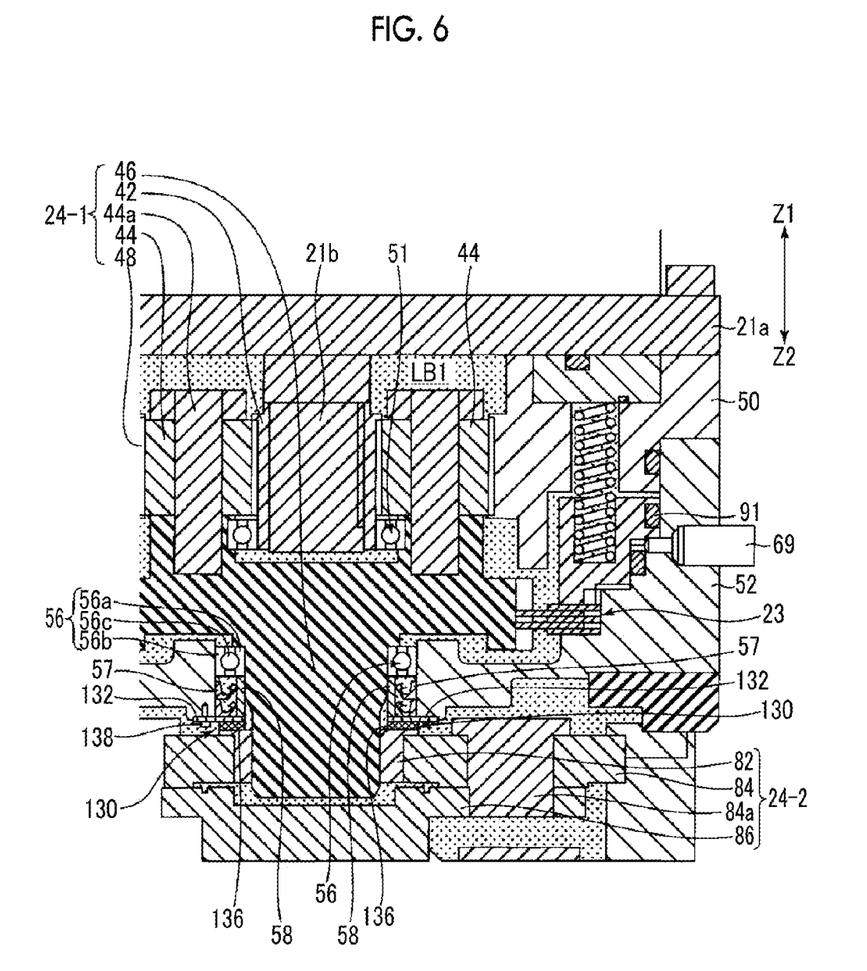
FIG. 6 is a cross-sectional view showing the vicinity of a movement restriction mechanism in the turning drive device in an enlarged manner.

In addition, FIG. 5 is a cross-sectional view of the turning drive device 40, and FIG. 6 is a cross-sectional view of the vicinity of the mechanical brake 23 of the turning drive device 40 in an enlarged manner.

Figure 4:
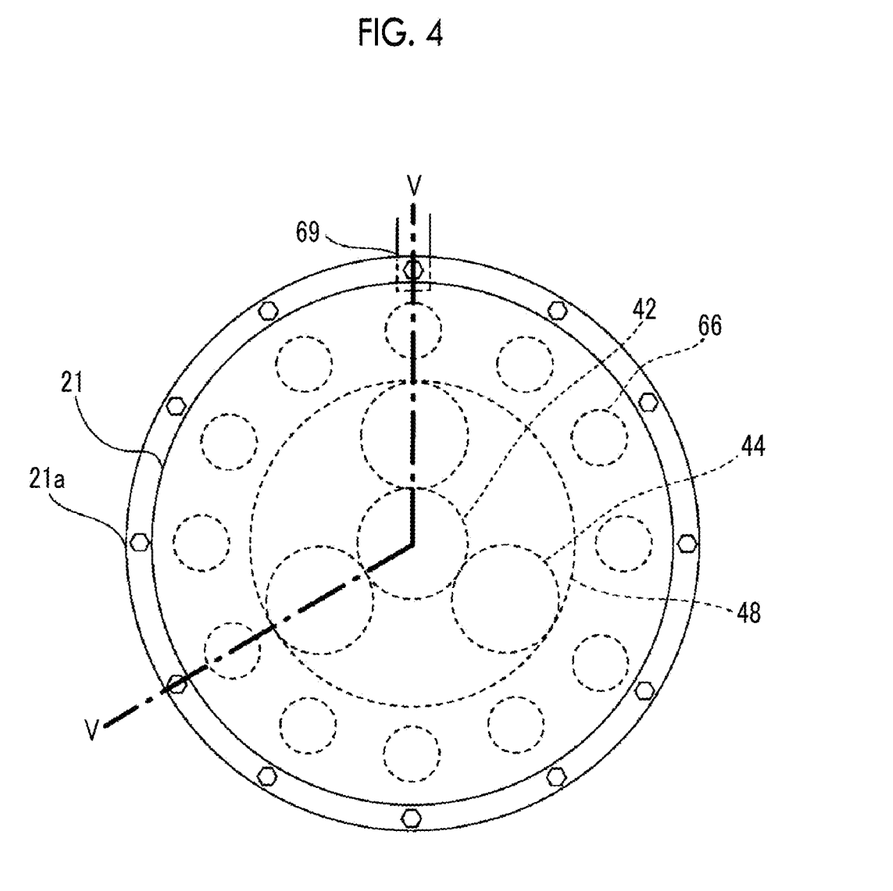
FIG. 4 is a top view of the turning drive device.

As shown in FIG. 4, the first turning speed reducer 24-1 is configured with a planetary gear speed reducer having a sun gear 42, a planetary gear 44, the planetary carrier 46, an internal gear 48, and the like. The first turning speed reducer 24-1 is accommodated in a first gear case 50 and a second gear case 52.

The sun gear 42 is fixed to the output shaft 21b of the electric motor for turning 21. In this embodiment, three planetary gears 44 are engaged with the sun gear 42.

Each of the planetary gears 44 is rotatably supported on a pin 44a provided to be erect at the planetary carrier 46. A flange-shaped portion 44b which prevents the planetary gear 44 from being separated from the pin 44a is provided at an upper end portion of the pin 44a. For this reason, the planetary gear 44 is configured so as not to be separated from the planetary carrier 46.

Further, each of the planetary gears 44 is engaged with the internal gear 48 formed in the inner surface of the first gear case 50. The first gear case 50 with the internal gear 48 formed therein is fixed to an end plate 21a of the electric motor for turning 21. Accordingly, the internal gear 48 (the first gear case 50) cannot rotate by itself.

On the other hand, a lower portion of the planetary carrier 46 serves as the output shaft of the first turning speed reducer 24-1. The planetary carrier 46 serving as the output shaft is rotatably supported on the second gear case 52 fixed to the first gear case 50, through a bearing 56.

The bearing 56 has an inner ring 56a, an outer ring 56b, balls 56c, and the like (refer to FIG. 6). The inner ring 56a is disposed integrally with the planetary carrier 46, and the outer ring 56b is disposed at the second gear case 52. Further, the balls 56c are disposed between the inner ring 56a and the outer ring 56b. In this way, the planetary carrier 46 can rotate with respect to the second gear case 52.

Further, a bearing collar 58 which fixes the bearing 56 to the planetary carrier 46 is provided at a lower portion of the bearing 56. In addition, the first turning speed reducer 24-1 having the above-described configuration is lubricated by lubricating oil LB1.

In the first turning speed reducer 24-1 having the configuration as described above, if the output shaft 21b of the electric motor for turning 21 rotates and thus the sun gear 42 rotates, the planetary gear 44 rotates (rotates on its own axis). The planetary gear 44 is engaged with the internal gear 48 formed in the inner surface of the first gear case 50. Accordingly, the first gear case 50 with the internal gear 48 formed therein tries to rotate by the rotary force of the planetary gear 44.

However, the first gear case 50 cannot rotate because it is fixed to the end plate 21a of the electric motor for turning 21, as described above. In contrast, the planetary carrier 46 has a configuration in which it can rotate with respect to the second gear case 52.

As a result, the rotary force of the planetary gear 44 acts as a force to rotate the planetary carrier 46, and thus the planetary carrier 46 rotates. Due to this, the rotation of the output shaft 21b of the electric motor for turning 21 is reduced in speed at the first turning speed reducer 24-1 and is output from the planetary carrier 46.

Next, the second turning speed reducer 24-2 will be described. A sun gear 82 of the second turning speed reducer 24-2 is connected to the planetary carrier 46 serving as the output shaft of the first turning speed reducer 24-1. The sun gear 82 is engaged with a plurality of planetary gears 84. In addition, the planetary gears 84 are engaged with an internal gear 88 formed in the inner wall of a third gear case 54. Accordingly, the planetary gear 84 revolves while rotating between the sun gear 82 and the internal gear 88.

In this embodiment, the second turning speed reducer 24-2 has three planetary gears 84. Each of the planetary gears 84 is rotatably supported on a planetary carrier 86 through a pin 84a and revolves while rotating, thereby rotating the planetary carrier 86.

Each of the planetary gears 84 is rotatably supported on the pin 84a provided to be erect at the planetary carrier 86. A flange-shaped portion 84b which prevents the planetary gear 84 from being separated from the pin 84a is provided at an upper end portion of the pin 84a. For this reason, the planetary gear 84 is configured so as not to be separated from the planetary carrier 86.

The planetary carrier 86 configures an output shaft of the second turning speed reducer 24-2. In this embodiment, the second turning speed reducer 24-2 is a final stage speed reducer. Accordingly, the planetary carrier 86 serving as the output shaft of the second turning speed reducer 24-2 serves as the output shaft 40A of the turning speed reducer 24. The second turning speed reducer 24-2 is lubricated by lubricating oil LB2.

Due to the above-described configuration, the turning drive device 40 reduces the rotation speed of the output shaft 21b of the electric motor for turning 21 and increases the torque of the output shaft 40A.

In addition, in this embodiment, the turning speed reducer 24 has been described as being a speed reducer configuration having a two-stage configuration which is composed of the first turning speed reducer 24-1 and the second turning speed reducer 24-2. However, the number of stages of the speed reducers of the turning speed reducer 24 is not limited thereto and can be appropriately set based on the output of the electric motor for turning 21, torque which is required for the rotation mechanism 2, or the like.

Next, the mechanical brake 23 will be described.

The mechanical brake 23 is a displacer brake having a brake disc 60 and a brake plate 62. The mechanical brake 23 is provided between the second gear case 52 which is a fixed portion and the planetary carrier 46 which is an output shaft.

The brake disc 60 has a disc shape, as shown in FIG. 6, and an insertion hole 65 into which the planetary carrier 46 is inserted is formed at the center. Further, spline teeth are formed in the inner periphery of the insertion hole 65.

A spline is formed in an outer peripheral portion (a portion on which the brake disc 60 is mounted) of the planetary carrier 46. The spline is formed in the outer periphery of the planetary carrier 46 so as to extend in an up-down direction (a direction shown by arrows Z1 and Z2 in the drawings).

In addition, in the following description, the electric motor for turning 21 side with respect to the planetary carrier 46 is sometimes referred to as an upper side (a side of a direction of the arrow Z1) and the side opposite to the electric motor for turning 21 side with respect to the planetary carrier 46 is sometimes referred to as a lower side (a side of a direction of the arrow Z2).

Spline teeth formed in the brake disc 60 are configured so as to be engaged with the spline formed in the planetary carried 46. Accordingly, in a state where the brake disc 60 is mounted on the planetary carrier 46, a structure in which the brake disc 60 and the planetary carrier 46 are spline-connected is made.

In a state where the brake disc 60 and the planetary carrier 46 are spline-connected in this manner, the brake disc 60 is in a state of extending toward the outside in a direction of a radius of rotation from the planetary carrier 46. Further, the brake disc 60 cannot rotate with respect to the planetary carrier 46 but is in a state of being movable in an axial direction (the direction shown by the arrows Z1 and Z2 in FIGS. 5 and 6) of the planetary carrier 46.

The brake plates 62 are disposed on both upper and lower sides of the brake disc 60. The brake plate 62 has a disc shape with a hole formed at the center. Further, spline teeth are formed in the outer periphery of the brake plate 62.

A spline is formed in an annular inner wall portion (a portion on which the brake plate 62 is mounted) of the second gear case 52. The spline is formed in the inner wall of the second gear case 52 so as to extend in the above-described axial direction (the direction shown by the arrows Z1 and Z2).

The spline teeth formed in the brake plate 62 are configured so as to be engaged with the spline formed in the second gear case 52. Accordingly, in a state where the brake plate 62 is mounted on the second gear case 52, a structure in which the brake plate 62 and the second gear case 52 are spline-connected is made.

In a state where the brake plate 62 and the second gear case 52 are spline-connected in this manner, the brake plate 62 is in a state of extending toward the inside in the direction of a radius of rotation from the second gear case 52. Further, the brake plate 62 cannot rotate with respect to the second gear case 52 but is in a state of being movable in the axial direction (the direction shown by the arrows Z1 and Z2) of the planetary carrier 46.

Further, a piston 64 is disposed above the upper brake plate 62 in a state of being movable in the axial direction (the direction shown by the arrows Z1 and Z2) of the planetary carrier 46. The piston 64 is always pressed against the upper brake plate 62 by being pressed by a spring 66.

As described above, both the brake disc 60 and the brake plate 62 are movable in the axial direction of the planetary carrier 46. For this reason, if the brake plate 62 is pressed by the piston 64, the brake disc 60 is pressed to be sandwiched between the upper and lower brake plates 62. The brake disc 60 is pressed to be sandwiched between the brake plates 62, whereby a brake force to try to prevent the rotation of the brake disc 60 is generated in the mechanical brake 23.

As described above, the brake disc 60 has a configuration of being unable to rotate with respect to the planetary carrier 46. For this reason, the brake force acting on the brake disc 60 becomes a brake force (a braking force) stopping the rotation of the planetary carrier 46.

A hydraulic space 68 to which hydraulic oil can be supplied is formed between the piston 64 and the second gear case 52. Further, a brake release port 69 is connected to the hydraulic space 68. In addition, a seal member 91 such as an O-ring is disposed between the piston 64 and the second gear case 52 and performs sealing such that the hydraulic oil in the hydraulic space 68 does not leak.

The brake release port 69 is connected to the operating device 26. Then, if oil pressure is supplied from the pilot pump 15 to the hydraulic space 68 through the operating device 26, a hydraulic line 27a (refer to FIG. 2), and the brake release port 69, the piston 64 is pushed up by the oil pressure. In this way, a force pressing the brake plate 62 is eliminated, and thus the mechanical brake 23 enters a state where the brake is released.

In addition, the mechanical brake 23 having the above-described configuration is controlled so as to enter a state where the brake is released at the time of the turning of the upper turning body 3 and the brake is activated when the upper turning body 3 has stopped.

Here, in the turning drive device 40 having the above-described configuration, attention is paid to the bearing 56 which supports the planetary carrier 46 in the first gear case 50 and the second gear case 52. The planetary carrier 46 is restricted in position by the bearing 56 and the like, thereby being located at a predetermined mounting position in the first gear case 50 and the second gear case 52.

However, the shovel is used in a harsh environment. Accordingly, in a case where a great external force is applied to the upper turning body 3 and each component provided therein at the time of work, the sun gear 82 configuring the second turning speed reducer 24-2 is sometimes biased so as to move in a thrust direction (the direction of the arrow Z1) toward the first turning speed reducer 24-1 by the external force.

Since the sun gear 82 is connected to the planetary carrier 46, if the sun gear 82 is biased so as to move in the direction of the arrow Z1, the planetary carrier 46 is also biased so as to move, and thus an excessive thrust load is generated in the bearing 56, whereby there is a concern that the bearing 56 may be damaged.

In this embodiment, a movement restriction section 130 is provided, and thus a configuration is made in which even in a case where the sun gear 82 (the planetary carrier 46) moves, the bearing 56 is protected by the movement restriction section 130. Hereinafter, the movement restriction section 130 will be described.

As shown in an enlarged manner in FIG. 6, the movement restriction section 130 is fixed to a bottom portion of the first gear case 50. Further, the movement restriction section 130 is disposed at a position facing the sun gear 82 provided in the second turning speed reducer 24-2. The disposition position is also a boundary position between the first turning speed reducer 24-1 and the second turning speed reducer 24-2.

The movement restriction section 130 has a thrust plate 132, a thrust washer 136, a fixing bolt 138, and the like.

The thrust plate 132 is an annular metal plate in which a hole into which the output shaft of the planetary carrier 46 is inserted is formed at the center. The thrust plate 132 has a predetermined strength capable of restricting the movement of the sun gear 82 when the sun gear 82 moves, as will be described later.

Further, the thrust plate 132 is fixed to a bottom portion of the second gear case 52 by using a plurality of fixing bolts 138 (in FIG. 6, only one is shown). In the fixing state, the thrust plate 132 faces the sun gear 82 of the second turning speed reducer 24-2.

The thrust washer 136 is disposed between the sun gear 82 and the thrust plate 132. The thrust washer 136 receives a force to the lower side of the sun gear 82, which includes the force of gravity. Further, the thrust washer 136 performs lubrication between the sun gear 82 and the thrust plate 132.

In addition, a bearing member which is disposed between the sun gear 82 and the thrust plate 132 is not limited to the thrust washer 136, and it is also possible to use a thrust bearing or the like.

Next, an operation of the movement restriction section 130 having the above-described configuration will be described.

For example, a case where an external force is applied to the shovel and the sun gear 82 configuring the second turning speed reducer 24-2 moves toward the first turning speed reducer 24-1 due to the external force is assumed. That is, a case where the sun gear 82 moves in the thrust direction (the direction of the arrow Z1 in the drawings) toward the first turning speed reducer 24-1 is assumed.

In this embodiment, the movement restriction section 130 is disposed at a position facing the sun gear 82. Further, the movement restriction section 130 is fixed to the second gear case 52. Accordingly, if the sun gear 82 moves in the direction of the arrow Z1, the sun gear 82 presses the thrust plate 132 through the thrust washer 136.

However, the thrust plate 132 is solidly fixed to the second gear case 52. Further, the strength of the thrust plate 132 is set to be a strength to withstand a pressing force at which the sun gear 82 presses the thrust plate 132 due to an external force.

Therefore, even if the sun gear 82 tries to move, the movement is restricted by the movement restriction section 130. Further, the movement of the sun gear 82 is restricted, whereby the movement of the planetary carrier 46 to which the sun gear 82 is connected is also restricted. Accordingly, a thrust load in the thrust direction can be prevented from being generated in the bearing 56 supporting the planetary carrier 46, and thus damage can be prevented from occurring in the bearing 56.

In the embodiment described above, the second turning speed reducer 24-2 of a lower stage is not constrained with respect to the respective gear cases 50 and 52 and with respect to the first turning speed reducer 24-1 of an upper stage. In the second turning speed reducer 24-2 of the lower stage, in terms of the configuration thereof, there is a possibility that due to an external force or the like, the sun gear 82 may move up and down alone or the second turning speed reducer 24-2 (the sun gear 82, the planetary gear 84, the planetary carrier 86, and the internal gear 88) may move up and down as a whole.

However, in this embodiment, as described above, the movement can be received by the movement restriction section 130, and therefore, the occurrence of damage to the bearing 56 due to contact can be prevented. In particular, in a case where the turning speed reducer 24 has a two-stage configuration and a lower stage is a configuration such as the second turning speed reducer 24-2, the present invention is particularly effective.

A preferred embodiment of the present invention has been described above in detail. However, the present invention is not limited to the specific embodiment described above, and various modification and changes can be made within the scope of the concept of the present invention stated in the appended claims.

For example, in the embodiment described above, the movement restriction section 130 is configured by fixing the thrust plate 132 to the second gear case 52 by the fixing bolt 138. However, it is also possible to form a movement restriction section integrally with the second gear case 52.

It should be understood that the invention is not limited to the above-described embodiment, and may be modified into various forms on the basis of the spirit of the invention. Additionally, the modifications are included in the scope of the invention.

What is claimed is:

1. A shovel comprising:
   a speed reducer configured by stacking a plurality of gear speed reducers each having a sun gear, a planetary gear, an internal gear, and a carrier member supporting the planetary gear provided in a case, in a direction of an axis of rotation of an upper turning body; and
   a movement restriction section which is provided between the sun gear of one gear speed reducer among the gear speed reducers stacked in a plurality and another gear speed reducer stacked so as to face the sun gear and restricts movement of the sun gear of the one gear speed reducer toward the other gear speed reducer,
   wherein the movement restriction section is provided at the case.

2. The shovel according to claim 1, wherein the movement restriction section is a plate-shaped member fixed to the case.

3. The shovel according to claim 1, wherein a slide bearing member is provided between the movement restriction section and the sun gear.

4. The shovel according to claim 3, wherein the slide bearing member is a thrust washer or a thrust bearing.

* * * * *